Patented July 14, 1925.

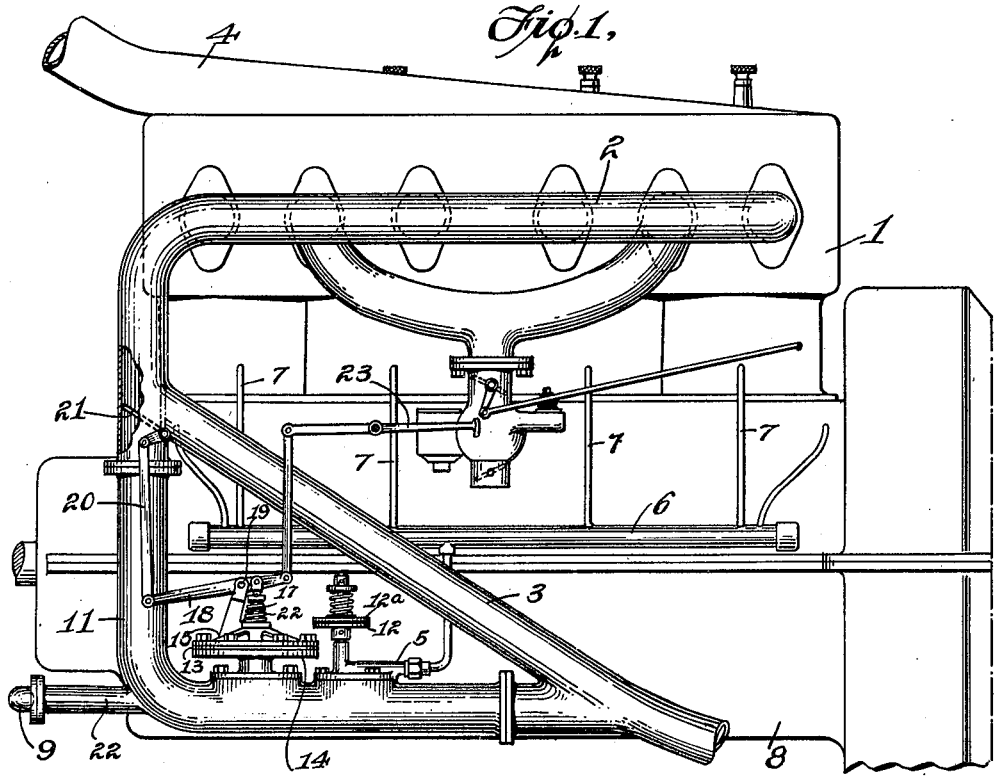
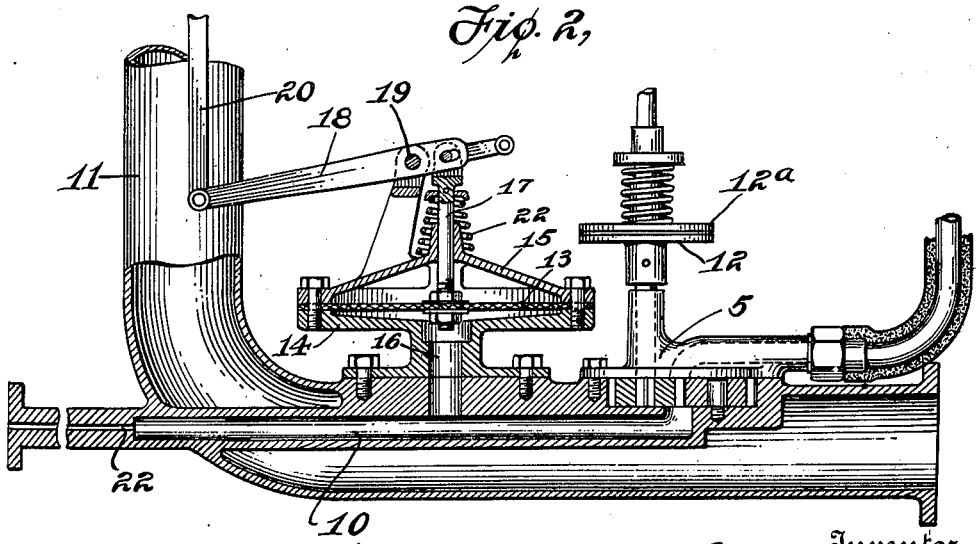

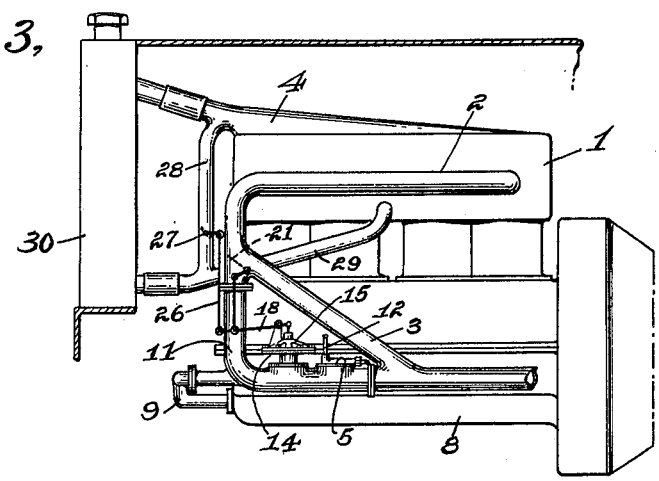
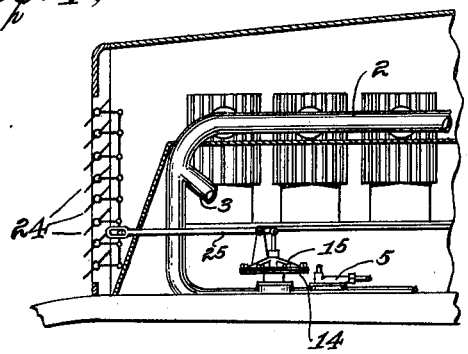

1,545,956

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

INTERNAL-COMBUSTION ENGINE.

Application filed July 22, 1920. Serial No. 398,192.

*To all whom it may concern:*

Be it known that I, JOHN GOOD, a citizen of the United States of America, residing in Garden City, Long Island, New York, have invented the following new and useful Improvements in Internal-Combustion Engines.

The invention relates to the lubricating systems of internal combustion engines, etc. and consists in the utilization of the change of viscosity of the lubricant, under changing temperature, either as a means of controlling the function of the system or as a means of controlling or operating other parts of the engine or its related equipment. When an engine is cold and its supply of lubricant is more or less stiff or congealed, the suction effort exerted by the oil pump is very much greater than when the oil has become heated by the engine operation. Measured at the suction intake of the pump the suction amounts to several pounds per square inch when the engine is cold, depending on the temperature and the speed of the pump, and drops back to a matter of a few ounces when the oil reaches its normal operating temperature. The same variation occurs on the pressure side of the pump. My object is to utilize the change in pressure condition which thus results from temperature change of the medium in a pump system, whether the pump be the oil pump of an engine or the pump of any other apparatus wherein it is desired to produce an effect dependent upon or coincident with the thermal condition of the apparatus. More especially my object is to employ the temporary abnormal suction, and change in suction in an engine, to cause it to be supplied with lubricant of a sufficiently fluid character to give adequate lubrication during the warming up period, when otherwise it would not receive such lubrication, the main body of lubricating oil being then so cold and viscous as not to be capable of flowing freely to the wearing surfaces. This is important in connection with the starting of automotive engines which are naturally exposed to outdoor temperatures, for it is known that much of the total wear in such engines is due to lack of sufficient lubrication during the first few moments of running after starting.

In the accompanying two sheets of drawings,

Fig. 1 is an elevation of an ordinary automotive internal combustion engine embodying the preferred form of the invention and applied to the control of the lubricating system as just mentioned;

Fig. 2 is a sectional detail thereof;

Fig. 3 illustrates the application of the invention for controlling the flow of the engine cooling water, and Fig. 4 shows its use for operating radiator shutters.

The engine 1 is provided with the usual exhaust manifold 2, exhaust pipe 3, cooling water outlet pipe 4, and oil pump 5. The latter is shown of the gear type and delivers through the oil manifold 6 to the various distributing pipes 7 which lead to the engine bearings. From the sump 8 in the crank case, constituting the normal operating source of engine lubricant, the oil is drawn through pipe 9 to passage 10 leading to the suction entrance of the pump. The pump is driven by the engine through a shaft 12, which may of course be variously organized in the engine according to its design. When the oil is warm and fluid it passes freely through the circuit just described, but when it is cold its flow is retarded, and the pump then exerts a greater suction due to the increased resistance to flow, and which is manifested in the suction line between the pump and crank-case. By connecting or interposing in this line a diaphragm or some similar motor element this initial and abnormal suction can be made effective for one purpose or another and for as long as the viscous condition of the oil continues.

In Figs. 1 to 4 this element comprises a flexible diaphragm 13 which is clamped at its edge between a cap 15, perforated to admit atmosphere to the top of the diaphragm, and a body 14 which forms an oil chamber in which the lower face of the diaphragm is exposed, through passage 16, to the pump suction in pipe 10; a spring 22 urges the diaphragm against the pressure of the atmosphere. Through the connections represented by the parts 17, 18, 19 and 20 this motor element operates a valve 21 in the engine exhaust pipe which controls the flow of exhaust through a by-pass 11, the latter being arranged in heat exchanging relation to the passage 10 leading to the pump. In normal operation, the engine oil being hot and limpid, the spring 22 holds the diaphragm 13 distended against the then very moderate suction of the pump and thereby holds valve 21 in its extreme position to the left, indicated in full lines in Fig. 1, closing by-pass 11 and permitting all the exhaust to pass through the normal exhaust pipe 3. When however a greater viscosity of the oil in the crank-case sump results in an increased suction effect, the reduction in pressure below the diaphragm allows the pressure of the atmosphere to depress it and thereby open valve 21 to the by-pass. To an extent corresponding to the change in viscosity, therefore, more or less of the exhaust flows through the by-pass and over pipe 10 and the lubricant pump, heating and reducing the viscosity of the oil passing through that pipe and the pump, and enabling the latter to supply adequate quantities to the engine bearings, at a time when, otherwise, the lubrication would be insufficient. When the continued running of the engine again raises the lubricant temperature, the diaphragm member returns valve 21 toward a position more nearly closing the exhaust by-pass, until ultimately the lubricant regains its normal operating viscosity when the by-pass is completely closed and the lubricating system thereafter operates without the heater.

It will be appreciated that the effect above described depends upon the resistance to flow presented by the suction line, between the crank-case and the point of connection with the motor element. For the best effect this resistance should be gauged so that it offers a minimum resistance to the hot oil, while yet giving the desired diaphragm movement with the cold oil, and while it may be constituted by various designs of pipe connections I prefer to use a restriction consisting of a round hole of about $\tfrac{3}{16}''$ diameter and about seven inches long, as indicated at 22. This is suitable for the general run of engine lubricating systems and gives a marked differentiation between the hot and cold conditions.

The motor element 13 can also be used to prevent a full opening of the engine throttle until the engine is warmed up and ready to carry full load, thereby safeguarding against misuse. For this purpose the lever 18 is connected, in Fig. 1, by a link with a lever 23 which is appropriately mounted so that while the engine is cold and diaphragm 13 depressed, it will stand in the path of the crank-arm of the engine throttle as shown and obstruct its opening movement beyond, say a half-way position. When the engine is warmed up as indicated by the diminished viscosity of its lubricating oil and the return of the diaphragm, this obstruction is removed and the throttle can then be fully opened. It will be understood that this is an adjunct to the oil heating mechanism above described and is to be used with it or without it as desired and that it can be incorporated in various forms of link and leverage design.

In Fig. 4 the same form of motor element is shown connected to the series of shutters 24 which control the flow of air for cooling either the engine cylinders directly, in the case of an air-cooled engine, or the radiator in a water-cooled engine. The operating connection is shown as a simple lever, 25, but can obviously take any suitable form so as to open the shutters as the lubricating oil increases in temperature and close them, or permit them to be closed, as it decreases. I have found that the temperature curve of the lubricating oil closely follows that of the jacket water and consequently a motor element operated by the viscosity-induced suction of the oil pump as above described can also be used to control the circulation of the water in the cooling systems of water-jacketed engines. This is shown for example in Fig. 3 wherein the same arrangement for supplying the engine with heated oil when it is started and until it warms up, is shown equipped with an additional link connection 26 to a valve 27 in a by-pass pipe 28. This pipe is connected between inlet and outlet 29 of the radiator 30 so that when it is open the circulation will take place to a greater or less extent through it rather than through the radiator, thereby allowing the water in the engine jacket to heat up quickly and permitting the radiator to come into the circulation slowly after the engine has become warm. Similar by-passes are already well known, being generally operated by thermostatic action, but it will be apparent that the operating means just described is superior to the use of a thermostat because of its greater power and larger movement, which permits of a better graduation of the control to the actual thermal condition of the engine. In like manner various other members in and about the engine and its associated apparatus can be operated by the use of this invention, as will now be apparent.

In the case of rotary pumps, the pump shaft 12 is driven through a friction coupling 12ᵃ of any suitable design arranged to slip if the pump should contain water and be frozen when the engine is started. On such occasion the pump will be inoperative for a few moments until the exhaust gas has thawed it out. Fracture of the pump is thus avoided. In the case of other styles of pumps similar slip provisions are desirable although there is no limitation herein to the employment of any particular kind of means for moving the oil or medium which is subject to change of viscosity and controls the operation of the motor element. While I have specifically illustrated the invention in its relation to the suction side of the pump, that being preferred, it will now be quite apparent that the motor element can be operated by the positive pressure in the delivery line of the pump, if desired, this being merely a reversal of the action above described and requiring merely obvious modifications of structure as will now be apparent. In any case where the invention is used for heating and thereby thinning the lubricating oil, it is desirable to arrange the parts of the system closely together, or otherwise to protect the passages by a heat-insulating lagging as partly indicated in the drawings, so that there may be no undue loss of heat in transit.

I claim—

1. The combination with an internal combustion engine including the lubricating system thereof and the lubricant pump of said system, of a motor element exposed to a pressure condition established by the pump, and actuated by changes in the lubricant viscosity, and a device operated by said element.

2. The combination with an internal combustion engine including its lubricating system and the pump thereof, of a motor element exposed to the pump suction and related to a part of the engine power plant to control the latter under the influence of said suction, the pump intake passage being restricted between the source of lubricant and said element.

3. The combination with an internal combustion engine including its lubricating system and the pump thereof, of an element normally urged in one direction and exposed to the pressure condition established by the pump for movement in the opposite direction, and related to a part of the engine power plant to control the latter according to the change of said condition which accompanies change in the viscosity of the lubricant.

4. The combination with an internal combustion engine including its lubricating system and the pump thereof, of a movable element exposed at one side to the pump suction and at the other side to the atmosphere and a connection therefrom to a device operated thereby.

5. The combination with a liquid medium subject to change of viscosity and a pump for moving the medium, of a motor element connected to a pump passage and arranged to respond to changes of pressure condition therein due to changes of viscosity and relatively unadapted to respond to changes of pressure due to changes of pump speed when the liquid medium is limpid.

6. The combination with a source of liquid medium subject to change of viscosity and a pump for moving the medium, of means connected to the intake passage of the pump adapted for operation by the suction effect therein when the medium is relatively viscous and unaffected thereby when it is less viscous, and a restriction or resistance of predetermined value in said passage.

7. The combination with an internal combustion engine including its lubricating system and the pump thereof, of a controlling means connected to a passage of the pump and controlled by the change of pressure condition therein, and a restriction for said passage adapted to influence said pressure condition according to the viscosity of the lubricant.

8. The combination with an internal combustion engine including its lubricating reservoir and pump, of a device for causing the engine to be supplied with a lubricant thinner than that in the lubricant reservoir, said device being controlled by the change of the pressure condition established by the pump at different temperatures.

9. The combination with an internal combustion engine including its lubricating system and the pump thereof, of means to supply the pump intake with a lubricant thinner than that in the lubricant sump, and an element movable by the effect of abnormal suction of the pump to bring said means into operation.

10. The combination with an internal combustion engine including its lubricating system and the pump thereof, of an element operated by the abnormal pressure condition of the pump when the lubricant is cold, and a lubricant heater rendered active by the operation of said element.

11. The combination with an internal combustion engine including its exhaust passage and lubricating system and the pump of the latter, of an exhaust by-pass in heat-exchanging relation to the lubricating system, a valve for directing exhaust through the by-pass, and an element operated by the pump for controlling said valve.

12. The combination with an internal combustion engine including its exhaust passage, lubricant sump, lubricant pump, and passage connecting the sump to the pump intake, of an exhaust passage substantially surrounding said lubricant passage, a valve for controlling flow of exhaust through the passage, and an element controlled by the pump suction and in turn controlling said valve.

13. In an internal combustion engine having a lubricating system including a pump, the combination of a restriction in a passage of the system predetermined as to its flow restricting character to have a negligible effect on lubricant of normal operating temperature and adapted to produce an intensified pressure condition on cold lubricant, and means for utilizing said effect.

14. In an internal combustion engine, having a lubricating system including a pump, cooling means for the engine, and means governed by the change of the pump suction for controlling said means.

15. In an internal combustion engine having a lubricating system including a pump, a set of shutters for controlling the flow of air which dissipates the engine heat, and means for operating the shutters controlled by said lubricating system.

16. In an internal combustion engine having a lubricating system including an oil pump and a throttle of means controlled by the change of viscosity of the lubricant for controlling the manipulation of said throttle.

17. The combination with an internal combustion engine including the lubricating system thereof and the lubricant pump of said system, of an element normally urged in one direction and exposed to a pressure condition established by the pump acting on the lubricant for movement in the opposite direction and adapted to respond to the changes of pressure due to changes of viscosity of the lubricant, and means connected to said element to control a part of the engine power plant in accordance with said responses.

In testimony whereof, I have signed this specification.

JOHN GOOD.